United States Patent
Hirsch et al.

(10) Patent No.: US 8,295,771 B2
(45) Date of Patent: Oct. 23, 2012

(54) BLUETOOTH MICROPHONE ARRAY

(75) Inventors: Olaf Hirsch, Sunnyvale, CA (US); Dominique Everaere, Antibes (FR)

(73) Assignee: NXP, B.V. (NL)

( * ) Notice: Subject to any disclaimer, the term of this patent is extended or adjusted under 35 U.S.C. 154(b) by 556 days.

(21) Appl. No.: 12/373,068

(22) PCT Filed: Jul. 20, 2007

(86) PCT No.: PCT/IB2007/004546
§ 371 (c)(1), (2), (4) Date: Oct. 19, 2009

(87) PCT Pub. No.: WO2008/146082
PCT Pub. Date: Dec. 4, 2008

(65) Prior Publication Data
US 2010/0048131 A1    Feb. 25, 2010

Related U.S. Application Data

(60) Provisional application No. 60/832,495, filed on Jul. 21, 2006.

(51) Int. Cl.
*H04B 7/00* (2006.01)
(52) U.S. Cl. .............. 455/41.3; 455/41.2; 455/63.1; 381/93; 381/94.1
(58) Field of Classification Search .......... 455/41.1, 455/41.2, 41.3, 63.1, 509, 556.1, 569.1; 381/93, 381/94.1, 94.7
See application file for complete search history.

(56) References Cited

U.S. PATENT DOCUMENTS

| | | | |
|---|---|---|---|
| 7,761,107 B2 * | 7/2010 | Pasternak | 455/515 |
| 7,856,240 B2 * | 12/2010 | Gunn et al. | 455/509 |
| 2001/0024507 A1 | 9/2001 | Boesen | |
| 2005/0286713 A1 | 12/2005 | Gunn et al. | |
| 2007/0015467 A1 | 1/2007 | Nagayasu et al. | |
| 2007/0041589 A1 | 2/2007 | Patel et al. | |
| 2007/0160254 A1 | 7/2007 | Ritter et al. | |
| 2010/0130198 A1 * | 5/2010 | Kannappan et al. | 455/434 |

FOREIGN PATENT DOCUMENTS

| | | |
|---|---|---|
| WO | 01/78443 A2 | 10/2001 |
| WO | 2005036922 A1 | 4/2005 |
| WO | 2006/028587 A2 | 3/2006 |

* cited by examiner

Primary Examiner — Tuan H Nguyen (57) ABSTRACT

The present invention discloses a wireless telephone system using microphone arrays together with additional signal processing to suppress the background noise in the surrounding environment. The signal processing resources of a wireless telephone and multi-channel transmission capabilities of the Bluetooth transmission are used to suppress the background noise. The wireless telephone system includes a Bluetooth transceiver communicating to a wireless telephone through a multi-channel Bluetooth transmission, and an array of microphones coupled to the Bluetooth transceiver. The array of microphones includes a first microphone producing a first audio signal output and a second microphone producing a second audio signal output. The first audio signal output and second audio signal output are transmitted to the wireless telephone through the first channel and second channel of multi-channel Bluetooth transmission respectively. The system and method of the present invention allows using low cost Bluetooth transceiver(s) with multiple microphone arrays to provide the background noise suppression.

22 Claims, 6 Drawing Sheets

BLUETOOTH MICROPHONE ARRAY

FIELD OF THE INVENTION

The present invention generally relates to wireless communication, and more specifically relates to the signal processing in wireless telephone systems.

BACKGROUND

Background noise is an innate problem in wireless telephone communication systems. In a noisy environment, for example at the airport, on the street, in the car etc., an effective communication over the wireless telephone systems using hands-free is no easy task. To suppress the background noises, conventional wireless telephone systems include an array of microphone that receives a near-end user's voice and background noise and outputs corresponding audio signal outputs for subsequent encoding and transmission to the telephone of a far-end user.

However, these existing techniques require two microphones and additional signal processing capabilities to generate a signal which does not include background noise. While using these techniques in a wireless headset (for e.g. Bluetooth headset), the additional signal processing capabilities have to be provided inside the Bluetooth headset. The additional signal processing capabilities include various algorithms which attempt to differentiate between a voice component of the audio signal and a background noise component of the audio signal, and then attenuate the level of the background noise component.

To run these algorithms in the Bluetooth headset, additional signal processing capabilities are required. In the case of headsets, the signal processors are not powerful enough to process the signals to suppress background noise. Providing this additional functionality in the Bluetooth headset becomes an overload in implementation as well as power consumption reasons. Also, this is not a cost effective solution.

What is needed then, is a wireless telephone that suppresses the effect of background noise present in an input audio signal without additional signal processing capabilities and algorithms. The present invention has been developed to meet these needs in the art.

SUMMARY OF THE INVENTION

The present invention discloses a wireless telephone system using microphone arrays together with signal processing capabilities of the wireless telephone to suppress the background noise in the surrounding environment. The signal processing resources of a wireless telephone and multi-channel transmission capabilities of the Bluetooth transmission are used to suppress the background noise. The system and method of the present invention allows the usage of low cost Bluetooth transceiver(s) with multiple microphone arrays to provide the background noise suppression.

In an example embodiment of the present invention a wireless telephone system is provided. The wireless telephone system includes a Bluetooth transceiver configured to communicate to a wireless telephone through a multi-channel Bluetooth transmission, and an array of microphones coupled to the Bluetooth transceiver for receiving an audio signal input from a surrounding environment. The array of microphones includes a first microphone producing a first audio signal output and a second microphone producing a second audio signal output. The multi-channel Bluetooth transmission includes a first channel and a second channel. The first audio signal output is transmitted to the wireless telephone through the first channel and second audio signal output is transmitted through the second channel. The wireless telephone includes a signal processor for receiving the first audio signal output and second audio signal output. The signal processor calculates and removes the background noise using the first audio signal output and second audio signal output. The wireless telephone system also includes a speaker coupled to the Bluetooth transceiver and the audio signals corresponding to the speaker is transmitted through the first channel of the multi-channel Bluetooth transmission.

In another example embodiment of the present invention another configuration of a wireless telephone system is provided. The wireless telephone system includes a first Bluetooth transceiver configured to communicate to a wireless telephone through a multi-channel Bluetooth transmission, a second Bluetooth transceiver configured to communicate to the wireless telephone through the multi-channel Bluetooth transmission, and an array of microphones receiving an audio signal input from a surrounding environment. The array of microphones includes a first microphone producing a first audio signal output and a second microphone producing a second audio signal output. The first microphone is coupled to the first Bluetooth transceiver and the second microphone is coupled to the second Bluetooth transceiver. The multi-channel Bluetooth transmission includes a first channel and a second channel. The first audio signal output is transmitted to the wireless telephone through the first channel and second audio signal output is transmitted through the second channel. The wireless telephone includes a signal processor for receiving the first audio signal output and second audio signal output. The signal processor calculates and removes the background noise using the first audio signal output and second audio signal output. The wireless telephone system also includes a speaker coupled to the Bluetooth transceiver and the audio signals corresponding to the speaker is transmitted through the first channel of the multi-channel Bluetooth transmission.

In another example embodiment of the present invention, a method for processing audio signals in a wireless telephone system is provided. The method includes the steps of providing a Bluetooth transceiver configured to communicate to a wireless telephone through a multi-channel Bluetooth transmission, and providing an array of microphones coupled to the Bluetooth transceiver for receiving an audio signal input from a surrounding environment. The array of microphones includes a first microphone producing a first audio signal output and a second microphone producing a second audio signal output. The multi-channel Bluetooth transmission includes a first channel for transmitting the first audio signal output and a second channel for transmitting the second audio signal output. A signal processor is provided in the wireless telephone. The signal processor calculates and removes the background noise using the first audio signal output and second audio signal output.

In another example embodiment of the present invention, a method for processing audio signals in a wireless telephone system is provided. The method includes the steps of providing a first Bluetooth transceiver configured to communicate to a wireless telephone through a multi-channel Bluetooth transmission, providing a second Bluetooth transceiver configured to communicate to the wireless telephone through the multi-channel Bluetooth transmission, and providing an array of microphones receiving an audio signal input from a surrounding environment. The array of microphones includes a first microphone and a second microphone, where the first microphone is coupled to the first Bluetooth transceiver and the second microphone is coupled to the second Bluetooth transceiver. The first microphone produces a first audio signal output and the second microphone produces a second audio signal output. The first audio signal output and second audio signal output are transmitted to the wireless telephone through the first channel and second channel of multi-channel Bluetooth transmission respectively. A signal processor is provided in the wireless telephone. The signal processor calculates and removes the background noise using the first audio signal output and second audio signal output.

In another example embodiment of the present invention a wireless telephone system is provided. The wireless telephone system includes a set of Bluetooth transceivers configured to communicate to a wireless telephone through a multi-channel Bluetooth transmission and an array of microphones receiving an audio signal input from a surrounding environment. The set of Bluetooth transceivers includes a first Bluetooth transceiver, a second Bluetooth transceiver and a third Bluetooth transceiver. The array of microphones includes a first microphone and a second microphone, where the first microphone is coupled to the first Bluetooth transceiver and the second microphone is coupled to the second Bluetooth transceiver. The wireless telephone system also includes a speaker coupled to the third Bluetooth transceiver.

The above summary of the present invention is not intended to represent each disclosed embodiment, or every aspect, of the present invention. Other aspects and example embodiments are provided in the figures and the detailed description that follows.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention discloses a wireless telephone system using microphone arrays together with signal processing capabilities of the wireless telephone to suppress the background noise in the surrounding environment. The signal processing resources of a wireless telephone and multi-channel transmission capabilities of the Bluetooth transmission are used to suppress the background noise.

Instead of processing the audio input signals in the Bluetooth transceivers, they are transmitted to the wireless telephone using the Bluetooth communication channels.

Figure 1:
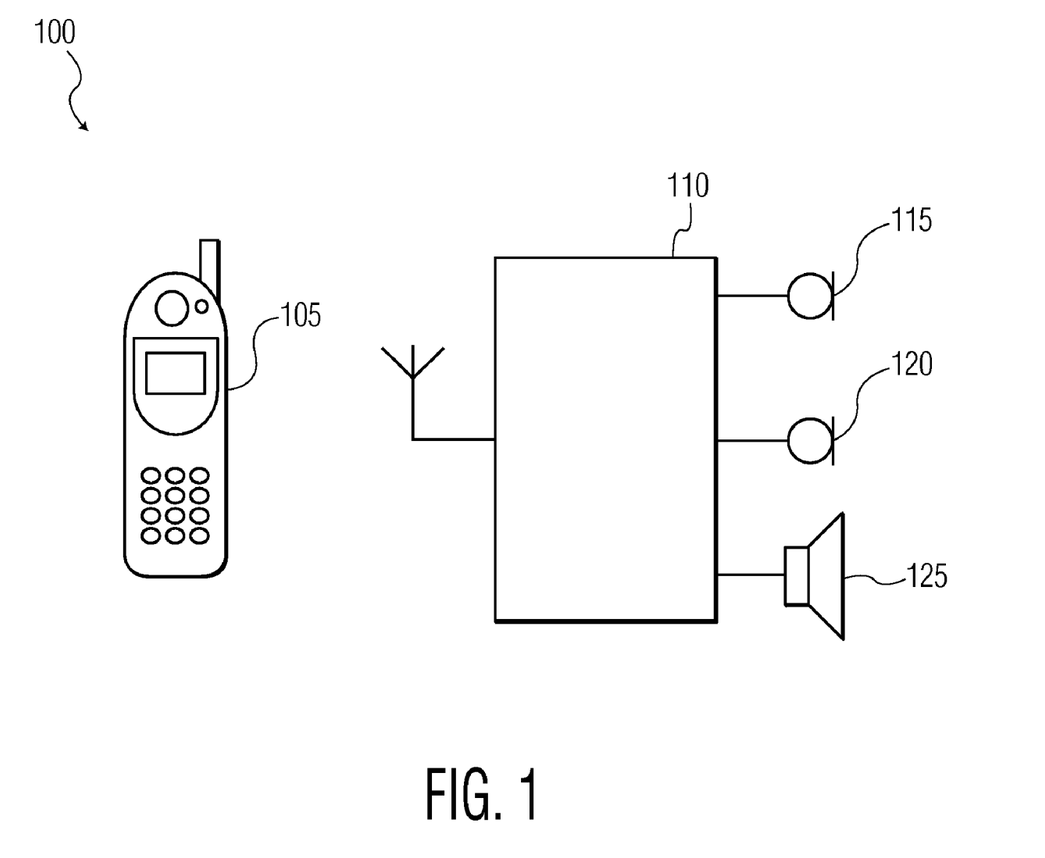
FIG. 1 is a block diagram illustrating a wireless telephone system according to an example embodiment of the present invention.

FIG. 1 is a block diagram illustrating a wireless telephone system 100 according to an example embodiment of the present invention. The wireless telephone system 100 includes a wireless telephone 105, a Bluetooth transceiver 110, a first microphone 115, a second microphone 120 and a speaker 125. The Bluetooth transceiver 110 is coupled to the first microphone 115, second microphone 120 and the speaker 125. Both the microphones 115, 120 receives the audio signal input from the surrounding environment and produces a first audio signal output and a second audio signal output. These audio outputs from the microphones 115, 120 are transmitted to the wireless telephone 105 using Bluetooth transmission. Bluetooth offers three channels for transmitting audio signals in a voice connection namely, EV3 channel 0 (first channel), EV3 channel 1 (second channel) and unused channel (third channel). The first and second audio signal outputs are transmitted through EV3 channel 0 and EV3 channel 1 respectively. These voice connections in the Bluetooth transmission are already supported by the default configuration and any additional signal processing capabilities are not needed for implementation. The signal processor in the wireless telephone 105 receives the audio signal outputs from the microphones 115, 120 and calculates the background noise using the audio signal outputs. The signal processor removes the background noise before transmitting the resulting signal to the remote end. The speaker audio signal is transmitted through the EV3 channel 0.

The audio signal outputs are transmitted separately to the wireless telephone 105. So, instead of processing the audio signals in the Bluetooth transceiver 110 (as in the prior art), they are transmitted separately to the wireless telephone 105 and the wireless telephone 105 processes the audio signals to suppress the background noise. In this way the Bluetooth transceiver 110 does not have to require additional signal processing capabilities. The present invention makes use of signal processing capabilities of the wireless telephone 105 for noise suppression.

Figure 2:
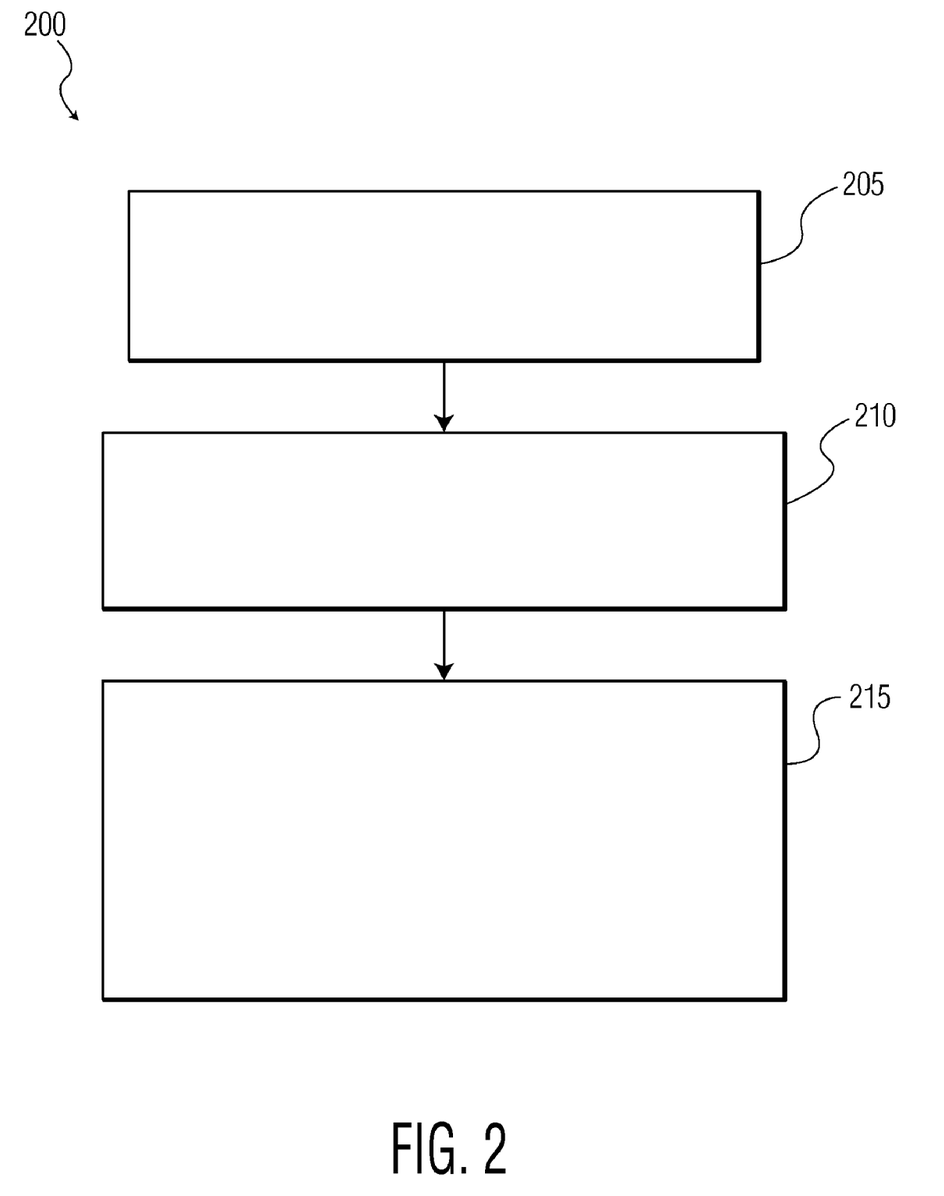
FIG. 2 is a flow diagram illustrating the method for processing audio signals in a wireless telephone system according to an example embodiment of the present invention.

FIG. 2 is a flow diagram illustrating the method for processing audio signals in a wireless telephone system according to an example embodiment of the present invention 200. In a step 205, a Bluetooth transceiver is provided which is configured to communicate to the wireless telephone through a multi-channel Bluetooth transmission. In another step 210, an array of microphones is coupled to the Bluetooth transceiver. The array of microphones includes a first microphone and a second microphone. The first microphone and second microphone receives the audio signals from the surrounding environment and produces a first audio signal output and a second audio signal output respectively. In a step 215, the audio output signals are transmitted to the wireless telephone. The first and second audio signal outputs are transmitted through EV3 channel 0 and EV3 channel 1 respectively. A signal processor in the wireless telephone is provided in the wireless telephone. The signal processor receives the audio outputs from the microphones and removes the background noise from the audio signals.

Figure 3:
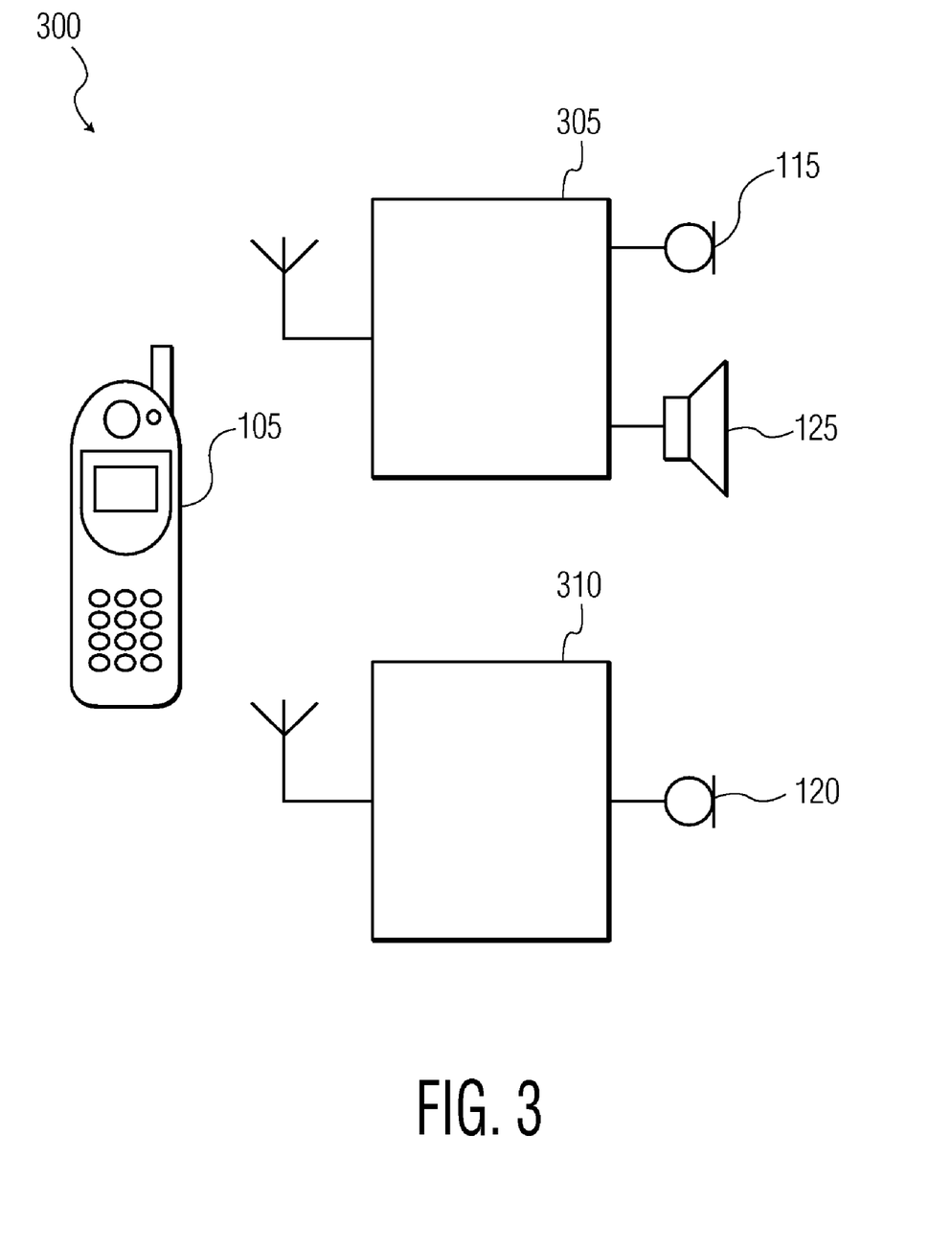
FIG. 3 is a block diagram illustrating a wireless telephone system where the microphones are spatially separated according to an example embodiment of the present invention.

FIG. 3 is a block diagram illustrating a wireless telephone system 300 where the microphones 115, 120 are spatially separated according to an example embodiment of the present invention. This configuration includes a spatially separated first microphone 115 and second microphone 120. The first microphone 115 and second microphone 120 are coupled to a first Bluetooth transceiver 305 and second Bluetooth transceiver 310 respectively. The speaker 125 is coupled to the first Bluetooth transceiver. The two microphones 115, 120 and the wireless telephone 105 create a single Bluetooth piconet. A piconet is defined as a collection of devices connected via Bluetooth technology in an ad hoc fashion. The audio signal outputs from the microphones 115, 120 are transmitted to the wireless telephone 105 using EV3 channel 0 and EV3 channel 1. The signal processor in the wireless telephone 105 removes the background noise in the same manner as described with FIG. 1.

This configuration does not require a connection between the two microphones 115, 120 and allows easier installation of a microphone array in vehicles (E.g. car). The first Bluetooth transceiver 305 provides only the first microphone data at a first location and the second Bluetooth transceiver 310 provides the second microphone data and other capabilities at a second location. The two Bluetooth transceivers 305, 310 are synchronized with each other. The first Bluetooth transceiver 305 may be considered as a Bluetooth headset and the second Bluetooth transceiver 310 as a Bluetooth microphone.

Figure 4:
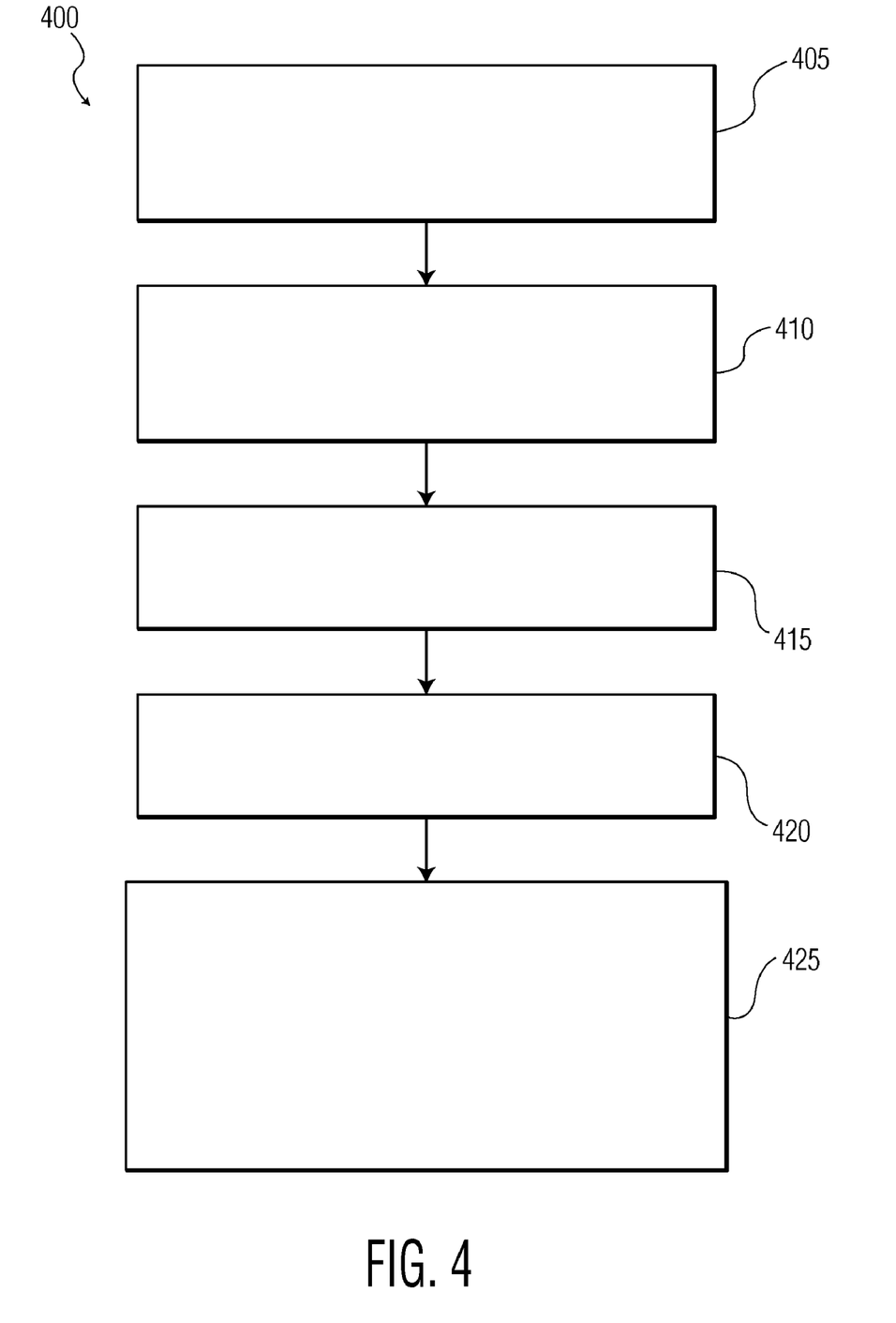
FIG. 4 is a flow diagram illustrating the method for processing audio signals in a wireless telephone system where the microphones are spatially separated according to an example embodiment of the present invention.

FIG. 4 is a flow diagram illustrating the method for processing audio signals in a wireless telephone system where the microphones are spatially separated according to an example embodiment of the present invention 400. A first Bluetooth transceiver and second Bluetooth transceiver are provided which are configured to communicate to the wireless telephone through the multi-channel Bluetooth transmission in steps 405 and 410 respectively. In a step 415, a first microphone is provided which is coupled to the first Bluetooth transceiver. In another step 420, a second microphone is provided which is coupled to the second Bluetooth transceiver. The microphones produce the first and second audio signal outputs. In step 425, the first and second audio signal outputs are transmitted through EV3 channel 0 and EV3 channel 1 respectively. The signal processor in the wireless telephone receives the first and second audio signal outputs. The background noise is calculated and removed and the resulting signal is transmitted to the remote end.

Figure 5:
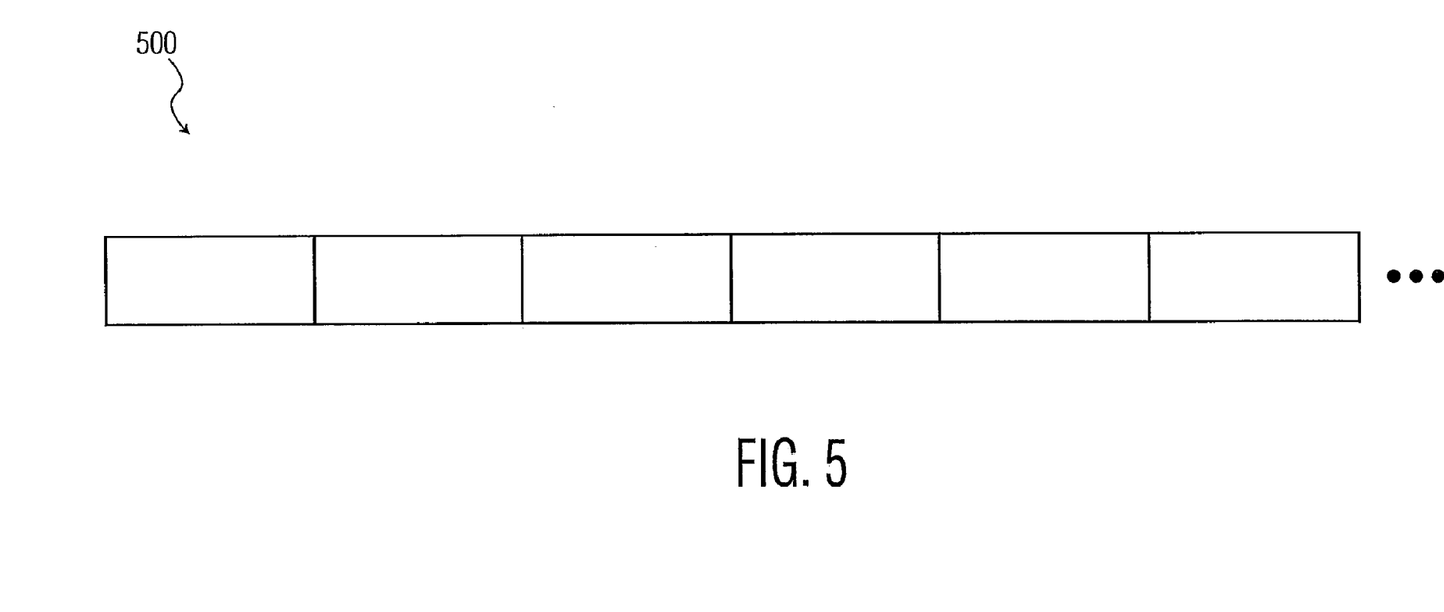
FIG. 5 is a prior art figure illustrating the multiple channels of Bluetooth transmission.

FIG. 5 illustrates the multiple channels of Bluetooth transmission for transmitting data 500. As shown in the figure, Bluetooth offers three channels for transmitting audio signals in a voice connection namely, EV3 channel 0, EV3 channel 1 and unused channel. This pattern of channels repeats periodically. The time interval for each channel is 1.25 ms. These Bluetooth channels are used to transmit the audio signal outputs from the microphones to the wireless telephone.

Figure 6:
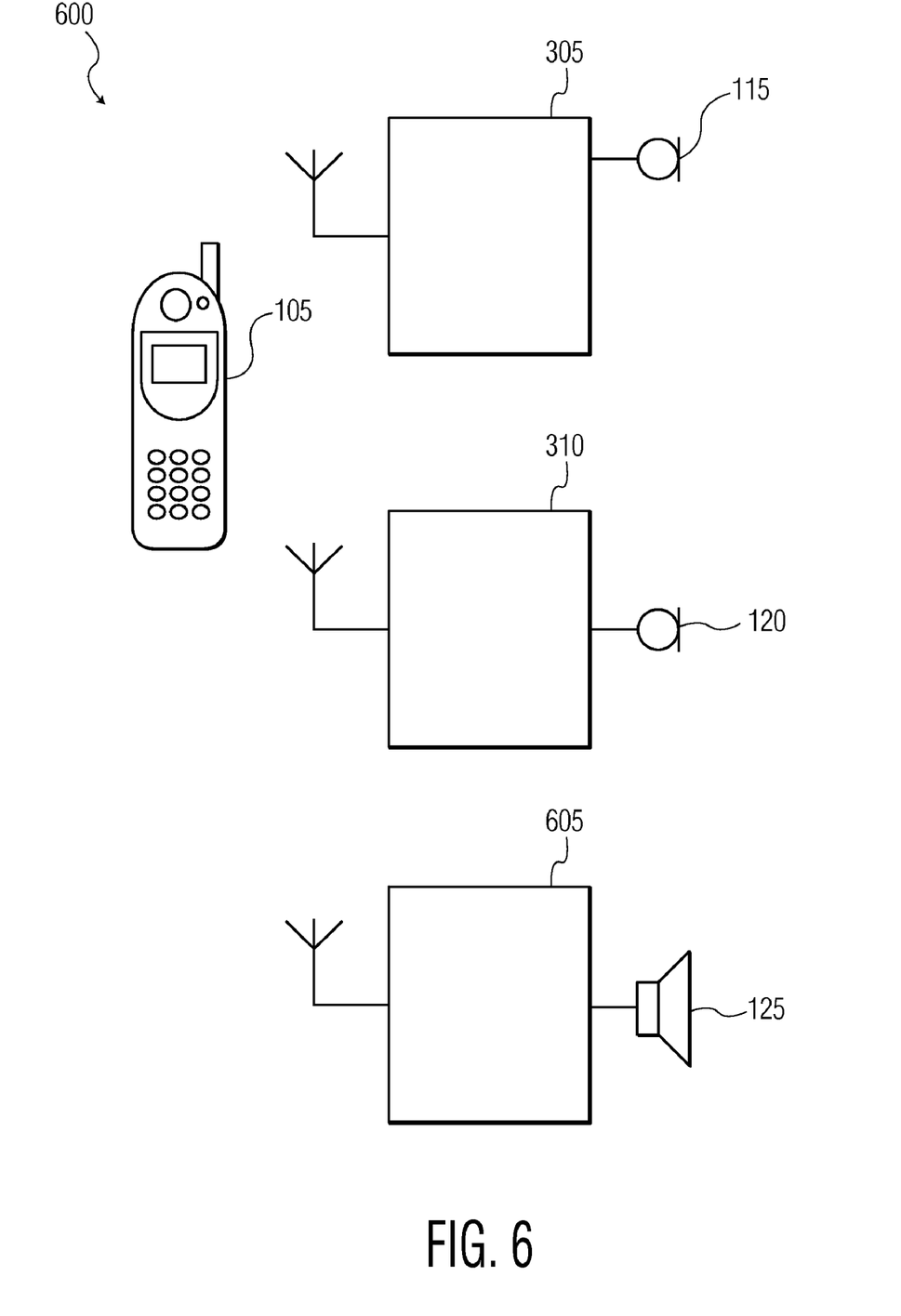
FIG. 6 is a block diagram illustrating a wireless telephone system where the speaker is coupled to a separate Bluetooth transceiver according to an example embodiment of the present invention.

FIG. 6 is a block diagram illustrating a wireless telephone system 600 where the speaker 125 is coupled to a separate Bluetooth transceiver 605 according to an example embodiment of the present invention. In this configuration two microphones 115, 120 and the speaker 125 have separate Bluetooth transceivers. The first microphone 115 is coupled to the first Bluetooth transceiver 305, second microphone 120 to the second Bluetooth transceiver 310, and speaker 125 to the third Bluetooth transceiver 605. The three Bluetooth transceivers 305, 310, 605 create a single Bluetooth piconet. The wireless telephone 105 removes the background noises in the same manner as described with FIG. 3.

Industrial Application

The applications of the present invention includes, but not limited to, the Bluetooth headset implementations in which only a limited amount of processing resources are located inside the Bluetooth headset. Also, the invention is applicable for hands free applications in which the microphones and speaker are spatially separated and not connected with a wire to each other.

While the present invention has been described with reference to several particular example embodiments, those skilled in the art will recognize that many changes may be made thereto without departing from the spirit and scope of the present invention, which is set forth in the following claims.

The invention claimed is:

1. A system comprising:
a single Bluetooth transceiver configured to communicate to a wireless telephone through a multi-channel Bluetooth transmission; and
an array of microphones coupled to said single Bluetooth transceiver for receiving an audio signal input from a surrounding environment, wherein said array of microphones comprise a first microphone producing a first audio signal output and a second microphone producing a second audio signal output;
wherein said multi-channel Bluetooth transmission comprises a first channel for transmitting said first audio signal output and a second channel for transmitting said second audio signal output, wherein said wireless telephone further comprises a signal processor for receiving the first audio signal output and second audio signal output, wherein said signal processor calculates and removes the background noise using the first audio signal output and second audio signal output, and wherein the first audio signal output and the second audio signal output are not processed in said single Bluetooth transceiver to suppress the background noise.

2. The system of claim 1 further comprises:
a speaker coupled to the single Bluetooth transceiver, and wherein the audio signals corresponding to said speaker are transmitted through the first channel of the multi-channel Bluetooth transmission.

3. A system comprising:
a first Bluetooth transceiver configured to communicate to a wireless telephone through a multi-channel Bluetooth transmission;
a second Bluetooth transceiver configured to communicate to said wireless telephone through said multi-channel Bluetooth transmission; and
an array of microphones receiving an audio signal input from a surrounding environment, said array of microphones comprising a first microphone and a second microphone, wherein said first microphone is coupled to said first Bluetooth transceiver and said second microphone is coupled to said second Bluetooth transceiver, and wherein audio signals from said array of microphones are not processed in said first Bluetooth transceiver and said second Bluetooth transceiver to suppress the background noise.

4. The system of claim 3, wherein the first microphone produces a first audio signal output and the second microphone produces a second audio signal output.

5. The system of claim 3, wherein the multi-channel Bluetooth transmission comprises a first channel for transmitting said first audio signal output and a second channel for transmitting said second audio signal output.

6. The system of claim 3, wherein the wireless telephone further comprises a signal processor for receiving the first audio signal output and second audio signal output.

7. The system of claim 6, wherein said signal processor calculates and removes the background noise using the first audio signal output and second audio signal output, and wherein the background noise is calculated and removed solely in the wireless phone.

8. The system of claim 3 further comprises:
a speaker coupled to the first Bluetooth transceiver, and wherein the audio signals corresponding to said speaker are transmitted through the first channel of the multi-channel Bluetooth transmission.

9. The system of claim 3, wherein the first microphone, the second microphone and the wireless telephone create a single Bluetooth piconet.

10. A method for processing audio signals in a system comprising the steps of:
providing a single Bluetooth transceiver configured to communicate to a wireless telephone through a multi-channel Bluetooth transmission; and
providing an array of microphones coupled to said single Bluetooth transceiver for receiving an audio signal input from a surrounding environment, wherein said array of microphones comprise a first microphone producing a first audio signal output and a second microphone producing a second audio signal output;
wherein said multi-channel Bluetooth transmission comprises a first channel for transmitting said first audio signal output and a second channel for transmitting said second audio signal output, wherein said wireless telephone comprises a signal processor for receiving the first audio signal output and second audio signal output, wherein said signal processor calculates and removes the background noise using the first audio signal output and second audio signal output, and wherein the first audio signal output and the second audio signal output are not processed in said single Bluetooth transceiver to suppress the background noise.

11. The method of claim 10 further comprises: providing a speaker coupled to the single Bluetooth transceiver, and wherein the audio signals corresponding to said speaker are transmitted through the first channel of the multi-channel Bluetooth transmission.

12. A method for processing audio signals in a system comprising the steps of:
providing a first Bluetooth transceiver configured to communicate to a wireless telephone through a multi-channel Bluetooth transmission;
providing a second Bluetooth transceiver configured to communicate to said wireless telephone through said multi-channel Bluetooth transmission; and
providing an array of microphones receiving an audio signal input from a surrounding environment, said array of microphones comprising a first microphone and a second microphone, wherein said first microphone is coupled to said first Bluetooth transceiver and said second microphone is coupled to said second Bluetooth transceiver, and wherein audio signals from said array of microphones are not processed in said first Bluetooth transceiver and said second Bluetooth transceiver to suppress the background noise.

13. The method of claim 12, wherein the first microphone produces a first audio signal output and the second microphone produces a second audio signal output.

14. The method of claim 12, wherein the multi-channel Bluetooth transmission comprises a first channel for transmitting said first audio signal output and a second channel for transmitting said second audio signal output.

15. The method of claim 12, wherein the wireless telephone further a signal processor for receiving the first audio signal output and second audio signal output.

16. The method of claim 15, wherein said signal processor calculates and removes the background noise using the first audio signal output and second audio signal output, and wherein the background noise is calculated and removed solely in the wireless phone.

17. The method of claim 12 further comprises: providing a speaker coupled to the first Bluetooth transceiver, and wherein the audio signals corresponding to said speaker are transmitted through the first channel of the multi-channel Bluetooth transmission.

18. A system comprising:
a set of Bluetooth transceivers configured to communicate to a wireless telephone through a multi-channel Bluetooth transmission, wherein said set of Bluetooth transceivers comprise a first Bluetooth transceiver, a second Bluetooth transceiver and a third Bluetooth transceiver; and
an array of microphones receiving an audio signal input from a surrounding environment, said array of microphones comprising a first microphone and a second microphone, wherein said first microphone is coupled to said first Bluetooth transceiver and said second microphone is coupled to said second Bluetooth transceiver, and wherein audio signals from said array of microphones are not processed in said set of Bluetooth transceivers to suppress the background noise; and
a speaker coupled to said third Bluetooth transceiver.

19. The system of claim 18, wherein the first microphone produces a first audio signal output and the second microphone produces a second audio signal output.

20. The system of claim 18, wherein the multi-channel Bluetooth transmission comprises a first channel for transmitting said first audio signal output and a second channel for transmitting said second audio signal output.

21. The system of claim 18, wherein the wireless telephone comprises a signal processor for receiving the first audio signal output and second audio signal output.

22. The system of claim 18, wherein the set of Bluetooth transceivers create a single Bluetooth piconet.

* * * * *